(12) United States Patent
Lai

(10) Patent No.: US 8,025,446 B2
(45) Date of Patent: Sep. 27, 2011

(54) LENS MODULE AND IMAGING APPARATUS USING SAME

(75) Inventor: Cheng-Yi Lai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/772,999

(22) Filed: May 3, 2010

(65) Prior Publication Data

US 2011/0150454 A1 Jun. 23, 2011

(30) Foreign Application Priority Data

Dec. 22, 2009 (TW) .............................. 98144052 A

(51) Int. Cl.
*G03B 15/00* (2006.01)

(52) U.S. Cl. ...................................... 396/351

(58) Field of Classification Search ........... 396/351–352
See application file for complete search history.

(56) References Cited

U.S. PATENT DOCUMENTS

| 7,813,052 B2 * | 10/2010 | Eguchi et al. ................. 359/694 |
| 2006/0017834 A1 * | 1/2006 | Konno et al. ................. 348/335 |
| 2007/0077057 A1 * | 4/2007 | Chang ........................... 396/351 |

* cited by examiner

*Primary Examiner* — Clayton E Laballe
*Assistant Examiner* — Dennis Hancock
(74) *Attorney, Agent, or Firm* — Altis Law Group, Inc.

(57) ABSTRACT

A lens module includes a lens barrel and a number of lenses received in the lens barrel. The lens barrel defines a light incident opening in a side surface thereof for light passing therethrough. The lenses include a reflecting lens. The reflecting lens includes a light incident surface, a light output surface, and a total reflection surface. The light incident surface faces the light incident opening, and the light output surface faces an end of the lens barrel. The total reflection surface is configured for reflecting incident light from the light incident surface to the light output surface.

13 Claims, 2 Drawing Sheets

LENS MODULE AND IMAGING APPARATUS USING SAME

BACKGROUND

1. Technical Field

The present disclosure relates to a lens module and an image apparatus using the same.

2. Description of Related Art

Nowadays, compact size imaging apparatuses, in devices such as portable electronic cameras, are very popular. To manufacture these imaging apparatus, the total length of the lens module must be reduced. Currently, the optical components, such as lenses and spacers, of the lens module are aligned along the central axis of a lens barrel, when imaging, incidence light from objects passes through the lens barrel from one end to the other, along a linear direction. In addition, there should be a space between the two optical components, for the purpose of focusing and ensuring the quality of the image. Therefore, the total length of the lens module is limited and cannot further miniaturization is difficult to achieve.

What is needed therefore, is a lens module and an imaging apparatus using the same overcoming the above-mentioned problems.

BRIEF DESCRIPTION OF THE DRAWINGS

The components of the drawings are not necessarily drawn to scale, the emphasis instead being placed upon clearly illustrating the principles of the embodiments of the lens module and the imaging apparatus using the same. Moreover, in the drawings, like reference numerals designate corresponding parts throughout the views.

DETAILED DESCRIPTION

Figure 1:
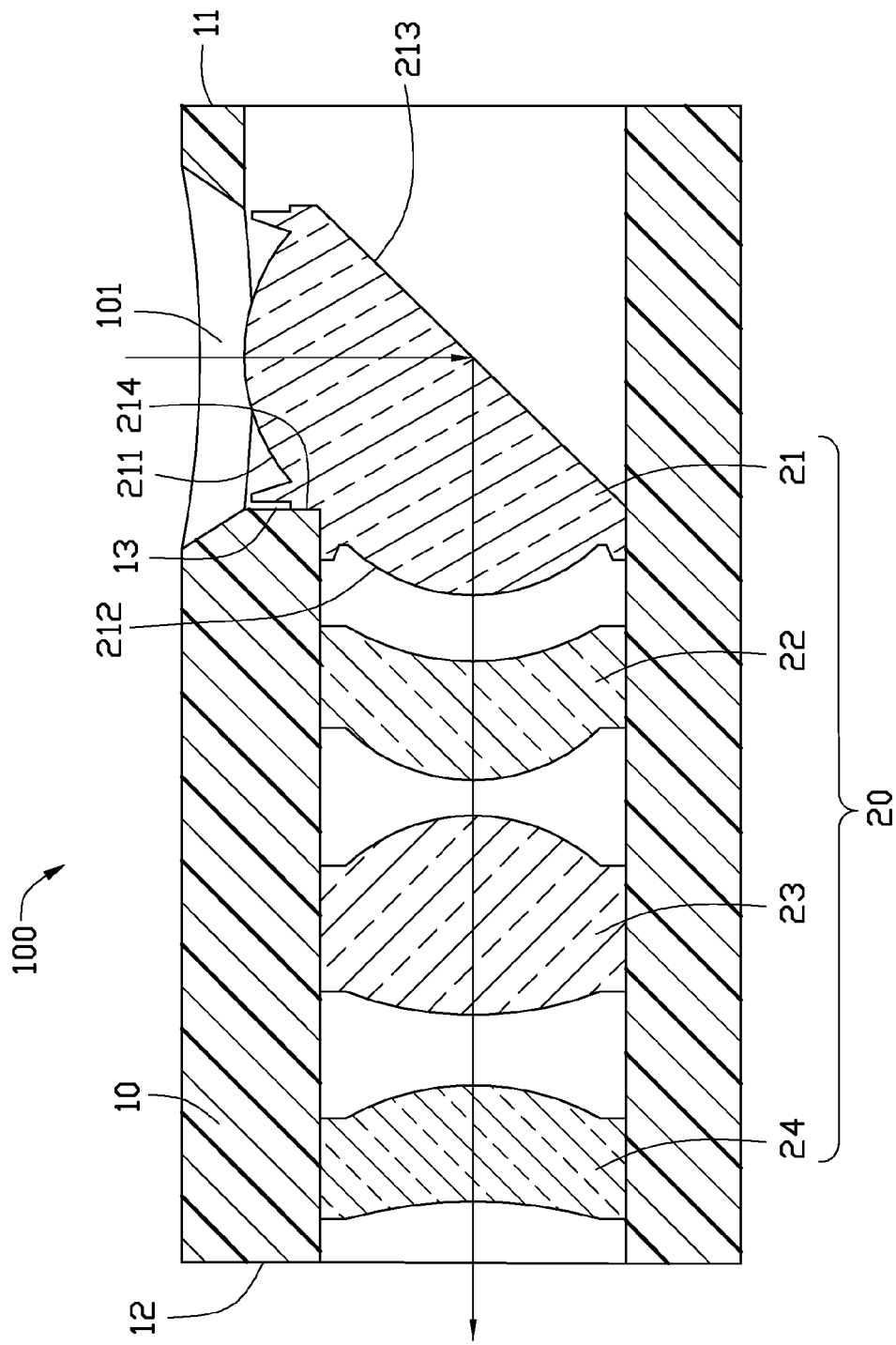
FIG. 1 is an isometric, schematic view of a lens module, according to an exemplary embodiment of the present disclosure.

Referring to FIG. 1, a lens module 10, according to an exemplary embodiment, is shown. The lens module 10 includes a hollow lens barrel 10 and a number of lenses 20 received in the lens barrel 10.

The lens barrel 10 includes an object side end 11 and an image side end 12 opposite to the object side end 11. The lens barrel 10 defines a light incident opening 101 in the side surface near the object side end 11 thereof, for passing light therethrough. The lens barrel 10 further includes a step portion 13 formed in the inner surface thereof, adjacent to the light incident opening 101.

The lenses 20 include a reflecting lens 21, a first lens 22, a second lens 23, and a third lens 24. The reflecting lens 21 includes a light incident surface 211 facing the light incident opening 101, a light output surface 212 facing the second lens 23, and a total reflection surface 213. The light incident surface 211 and the light output surface 212 are curved, and the total reflection surface 213 is flat. In this embodiment, the light incident surface 211 and the light output surface 212 are aspherical convex surfaces, therefore the reflecting lens 21 provides positive refraction. A bisecting normal of the light incident surface 211 is substantially perpendicular to that of the light output surface 212, and the angles between the total reflection surface 213 and the bisecting normal of the light incident surface 211 and the light output surface 212 are respectively 45 degrees. The reflecting lens 21 defines a cutout portion 214 between the light incident surface 211 and the light output surface 212. In assembly, the reflecting lens 21 is inserted into the lens barrel 10 at the object side end 11, and the step portion 12 is engaged into the cutout portion 214.

The first lens 22, the second lens 23, and the third lens 24 are orderly aligned in the lens barrel 10 from the light output surface 212 of the reflecting lens 21 to the image side end 12 of the lens barrel 10. In this embodiment, the first lens 22 and the third lens 24 provide negative refraction, the second lens 23 provide positive refraction. The number and the shapes of the lenses 20 can be different according to different embodiments.

After assembling, the object side end 11 of the lens barrel 10 is enclosed. In use, incidence light passes into the lens barrel 10 from the light incident opening 101. Then it passes through the light incident surface 211 to the total reflection surface 213. Then the light is reflected by the total reflection surface 213 to the light output surface 212. Then it passes out of the reflecting lens 21 from the light output surface 212. Then it passes orderly through the first lens 22, the second lens 23 and the third lens 24. Finally, the light projects on the imaging surface of an image sensor (not shown).

Figure 2:
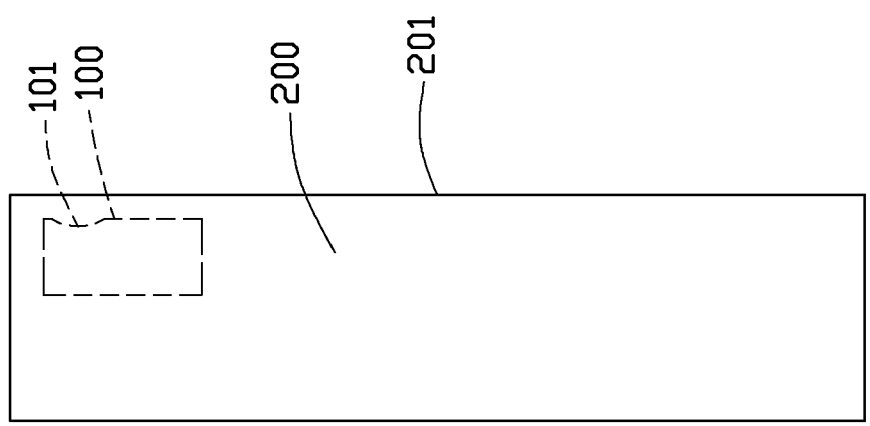
FIG. 2 is a schematic view of an imaging apparatus using the lens module of FIG. 1.

Referring to FIG. 2, an imaging apparatus 200 using the lens module 100 is shown. The imaging apparatus 200 includes an object side surface 201, when shooting, the object side surface 201 faces the object. Because the light incident opening 101 is defined in the side surface of the lens barrel 10, therefore light can pass into the lens barrel 10 from a direction perpendicular to the central axis of the lens barrel 10. Furthermore, because the reflecting lens 21 can reflect the incidence light from perpendicular angle to the central axis of the lens barrel 10 parallel to the central axis of the lens barrel 10. The lens module 100 is suitable to be mounted into the imaging apparatus 200 with the central axis thereof parallel to the object side surface 201 of the imaging apparatus 200. Therefore, the size (thickness) of the imaging apparatus 200 can be further reduced.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A lens module, comprising:
   a lens barrel defining a light incident opening in a side surface thereof for passing light therethrough, and comprising a step portion in an inner surface thereof adjacent to the light incident opening; and
   a plurality of lenses received in the lens barrel, the lenses comprising a reflecting lens, the reflecting lens comprising a light incident surface, a light output surface, and a total reflection surface, and the reflecting lens defining a cutout portion between the light incident surface and the light output surface;
   wherein the light incident surface faces the light incident opening, the light output surface faces an end of the lens barrel, the total reflection surface is configured for reflecting incident light from the light incident surface to the light output surface, and the step portion is engaged into the cutout portion.

2. The lens module of claim 1, wherein the lens barrel further comprises an object side end and an image side end opposite to the object side end, and the light incident opening is near the object side end.

3. The lens module of claim 2, wherein the lenses further comprise a first lens, a second lens and a third lens, the first lens, and the second lens and the third lens are orderly aligned in the lens barrel from the light output surface of the reflecting lens to the image side end of the lens barrel.

4. The lens module of claim 3, wherein the first lens and the third lens provide negative refraction, and the second lens provides positive refraction.

5. The lens module of claim 2, wherein the light incident surface and the light output surface are aspherical convex surfaces and provide positive refraction.

6. The lens module of claim 1, wherein the light incident surface and the light output surface are curved, the total reflection surface is flat, a bisecting normal of the light incident surface is substantially perpendicular to that of the light output surface, and the angles between the total reflection surface and the bisecting normal of the light incident surface and the light output surface are respectively 45 degrees.

7. An imaging apparatus, comprising:
an object side surface configured for facing an object during shooting; and
a lens module, comprising:
a lens barrel defining a light incident opening in a side surface thereof for passing light therethrough, and comprising a step portion formed in an inner surface thereof adjacent to the light incident opening; and
a plurality of lenses received in the lens barrel, the lenses comprising a reflecting lens, the reflecting lens comprising a light incident surface, a light output surface, and a total reflection surface, and the reflecting lens defining a cutout portion between the light incident surface and the light output surface;
wherein the light incident surface faces the light incident opening, the light output surface faces an end of the lens barrel, the total reflection surface is configured for reflecting incident light from the light incident surface to the light output surface, the lens module is mounted into the imaging apparatus with the central axis parallel to the object side surface, and the step portion is engaged into the cutout portion.

8. The imaging apparatus of claim 7, wherein the lens barrel further comprises an object side end and an image side end opposite to the object side end, and the light incident opening is near the object side end.

9. The imaging apparatus of claim 8, wherein the lenses comprise a first lens, a second lens and a third lens, the first lens, and the second lens and the third lens are orderly aligned in the lens barrel from the light output surface of the reflecting lens to the image side end of the lens barrel.

10. The imaging apparatus of claim 9, wherein the first lens and the third lens provide negative refraction, and the second lens provides positive refraction.

11. The imaging apparatus of claim 7, wherein the light incident surface and the light output surface are curved, the total reflection surface is flat, a bisecting normal of the light incident surface is substantially perpendicular to that of the light output surface, and the angles between the total reflection surface and the bisecting normal of the light incident surface and the light output surface are respectively 45 degrees.

12. The imaging apparatus of claim 7, wherein the light incident surface and the light output surface are aspherical convex surfaces and provide positive refraction.

13. A lens module, comprising:
a lens barrel defining a light incident opening in a side surface thereof for passing light therethrough, and comprising an object side end and an image side end opposite to the object side end, the light incident opening being near the object side end; and
a plurality of lenses received in the lens barrel, the lenses comprising a reflecting lens, a first lens, a second lens and a third lens, the reflecting lens comprising a light incident surface, a light output surface, and a total reflection surface, the first lens, the second lens and the third lens being orderly aligned in the lens barrel from the light output surface of the reflecting lens to the image side end of the lens barrel, the first lens and the third lens providing negative refraction, and the second lens providing positive refraction;
wherein the light incident surface faces the light incident opening, the light output surface faces toward an end of the lens barrel, and the total reflection surface is configured for reflecting incident light from the light incident surface to the light output surface.

* * * * *